United States Patent [19]
Seki et al.

[11] Patent Number: 5,113,338
[45] Date of Patent: May 12, 1992

[54] SIMILAR SHAPE PART PROGRAM CREATION METHOD

[75] Inventors: Masaki Seki; Takashi Takegahara, both of Tokyo; Takeshi Arakaki, Yamanashi, all of Japan

[73] Assignee: Fanuc Ltd., Yamanachi, Japan

[21] Appl. No.: 423,466

[22] PCT Filed: Feb. 3, 1989

[86] PCT No.: PCT/JP89/00111
§ 371 Date: Sep. 29, 1989
§ 102(e) Date: Sep. 29, 1989

[87] PCT Pub. No.: WO89/07292
PCT Pub. Date: Aug. 10, 1989

[30] Foreign Application Priority Data
Feb. 5, 1988 [JP] Japan .................. 63-25359

[51] Int. Cl.⁵ .................. G05B 19/403; G06F 3/04
[52] U.S. Cl. .................. 364/191; 364/188; 364/474.22; 364/474.23
[58] Field of Search .................. 364/188–193, 364/474.21–474.27, 518, 521, 522

[56] References Cited

U.S. PATENT DOCUMENTS

| | | | |
|---|---|---|---|
| 4,152,765 | 5/1979 | Weber | 364/474.27 |
| 4,328,550 | 5/1982 | Weber | 364/474.27 |
| 4,490,781 | 12/1984 | Kishi et al. | 364/474.25 |
| 4,635,185 | 1/1987 | Kishi et al. | 364/191 |
| 4,660,148 | 4/1987 | Kishi et al. | 364/188 |
| 4,704,687 | 11/1987 | Kishi et al. | 364/474.25 |
| 4,788,636 | 11/1988 | Shiratori et al. | 364/191 |
| 4,914,599 | 4/1990 | Seki et al. | 364/474.23 |
| 4,939,635 | 7/1990 | Seki et al. | 364/191 |
| 5,043,865 | 8/1991 | Seki et al. | 364/474.22 |

Primary Examiner—Jerry Smith
Assistant Examiner—Thomas E. Brown
Attorney, Agent, or Firm—Staas & Halsey

[57] ABSTRACT

The invention includes defining a profile of a part having a plurality of similar shapes (F1, F2, F4, F5); creating a part program for machining a first similar shape (F1), serving as a reference, by a motion definition statement; specifying similar shapes (F2, F4, F5), which are to be machined under machining conditions identical with those of the first similar shape (F1), in a state where the profile of the part is displayed on a display screen; and creating part programs for the specified similar shapes (F2, F4, F5) using the part program of the first similar shape (F1).

12 Claims, 8 Drawing Sheets

SIMILAR SHAPE PART PROGRAM CREATION METHOD

BACKGROUND OF THE INVENTION a. Field of the Invention

This invention relates to a similar shape part program creation method and, more particularly, to a part program creation method suited to creation of a part program for machining a part having a plurality of similar shapes.

b. Description of the Related Art

In an automatic programming system for creating NC data using an automatic programming language such as APT (automatically programmed tools) or FAPT, (a) a part program based on the automatic programming language is created by defining points, straight lines and circular arcs using simple symbols (this is referred to as "figure definition"), and defining a profile using the defined points, straight lines and circular arcs (referred to as "part profile definition"). Then, defining a tool path by an approach motion statement which causes the tool to approach, a profile motion statement which moves the tool along the part profile, and a withdrawal motion statement which causes the tool to withdraw (referred to as "motion statement definition"), and (b) the part program based on the automatic programming language is subsequently converted into NC data comprising NC data (EIA codes or ISO codes) in a format capable of being executed by an NC unit.

When a part program is created for machining a part having a plurality of similar shapes (inclusive of identical shapes), the conventional part program creation method is such that motion statement definition for such operations as approach/profile motion/withdrawal must be repeated even though the machining method is the same. The problem that results is that a great amount of time is required to create the part program.

SUMMARY OF THE INVENTION

Accordingly, an object of the present invention is to provide a part program creation method through which a part program for machining a part having a plurality of similar shapes can be created quickly and easily.

Another object of the present invention is to provide a similar shape part program creation method in which a plurality of similar shapes to be machined are disposed on a screen and a part program is created while the state of arrangement among the shapes is verified and studied.

The present invention provides a similar shape part program creation method which creates a part program for machining a first shape and one or more shapes similar to the first shape. The part program creation method includes defining a profile of a part having a plurality of similar shapes, creating a part program for machining a first shape serving as a reference, designating a similar shaped to be machined under machining conditions identical with those of the first shape, and thereafter creating a part program, for machining the similar shape using the part program of the first shape.

DESCRIPTION OF THE PREFERRED EMBODIMENTS

Figure 1:
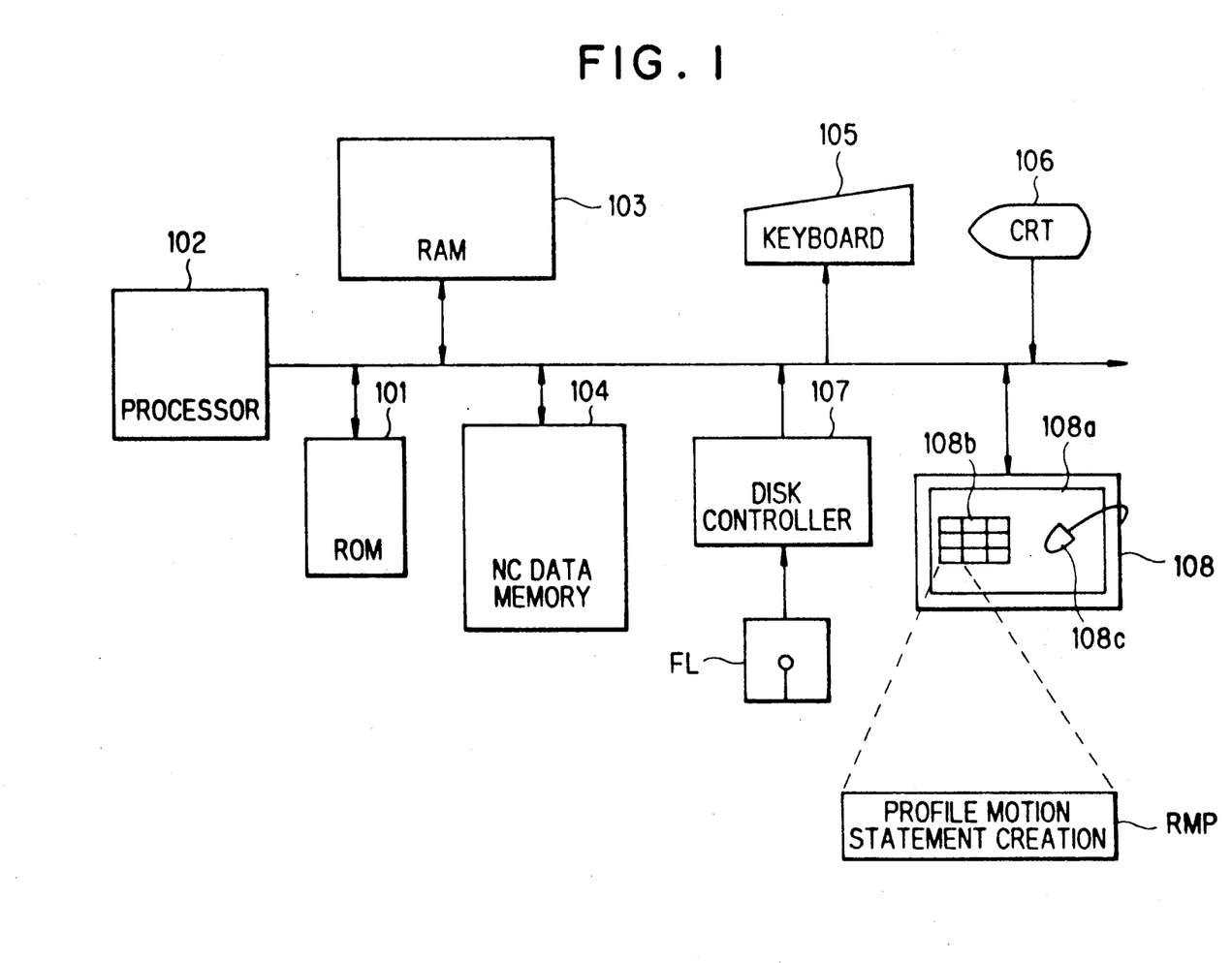
FIG. 1 is a block diagram of an apparatus for practicing the present invention.

FIG. 1 is a block diagram of an automatic programming apparatus for practicing the present invention.

Numeral 101 denotes a ROM storing a loading program and the like, 102 denotes a processor for executing automatic programming processing, and 103 denotes a RAM for storing a system program read in from a floppy FL, as well as various parameters and results of processing. Numeral 104 denotes an NC data memory for storing a part program based on automatic programming language, as well as finally created NC data having an executable format. Numeral 105 denotes a keyboard, 106 denotes a display unit (CRT), 107 denotes a disk controller, and 108 denotes a tablet device having a tablet surface 108a to which a menu chart 108b having menu items is affixed. Prescribed menu items (e.g., a "PROFILE MOTION STATEMENT CREATION" item RMP) are picked by a tablet cursor 108c. A graphic cursor on a display screen is moved by moving the cursor 108c on the tablet surface 108a. FL represents a floppy disk.

Figure 2A:
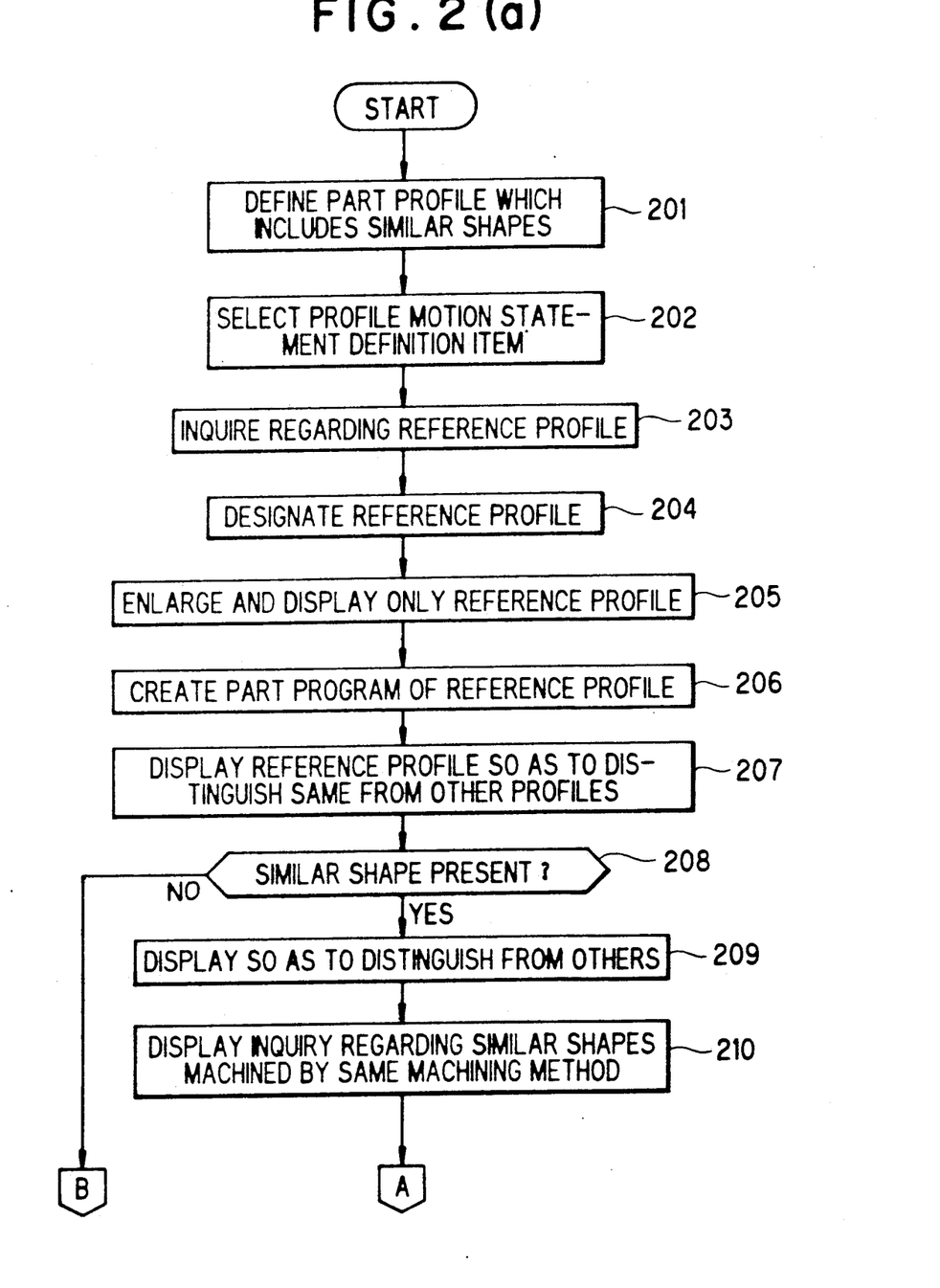
FIG. 2(a) and 2(b) are flowcharts of processing for creating a similar shape part program in accordance with the present invention.
Figure 2B:
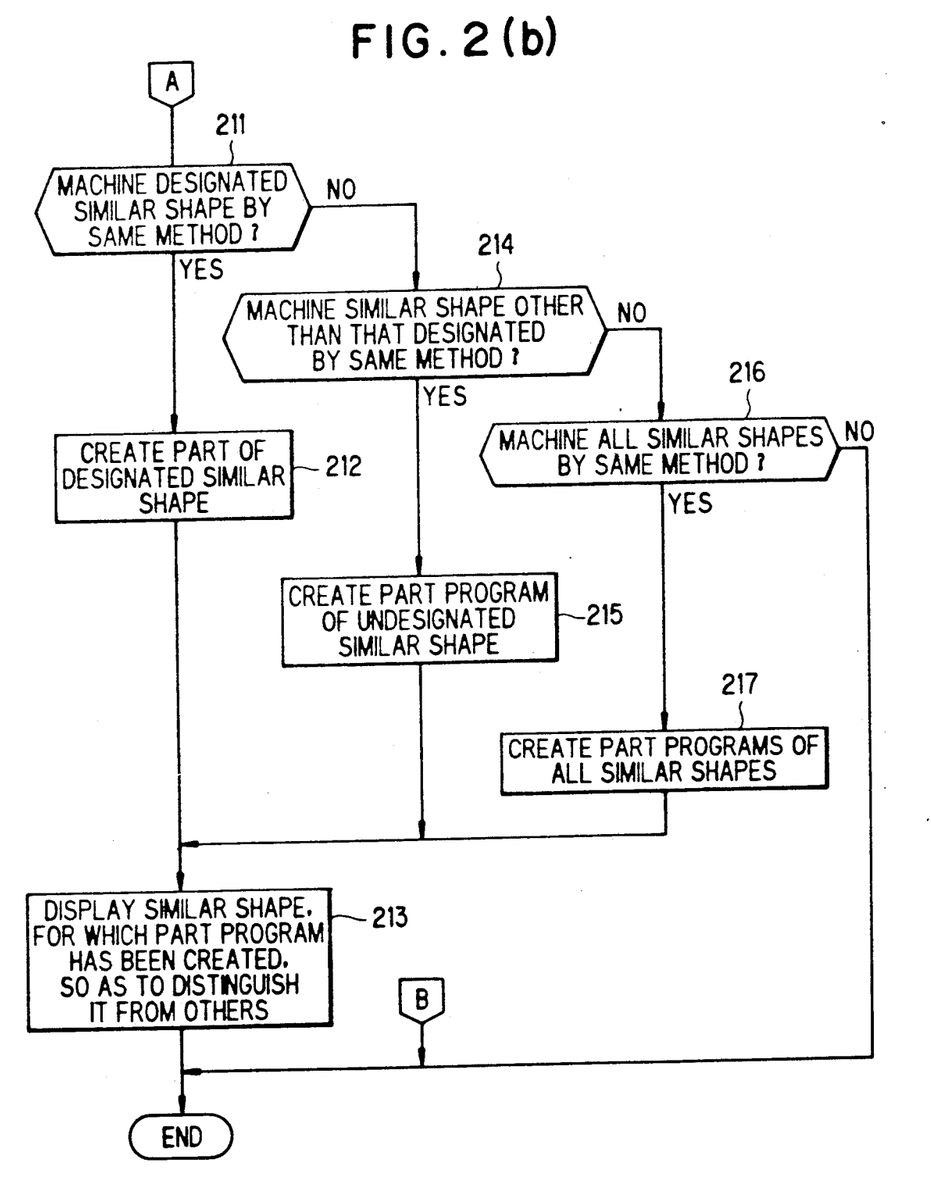
Figure 3:
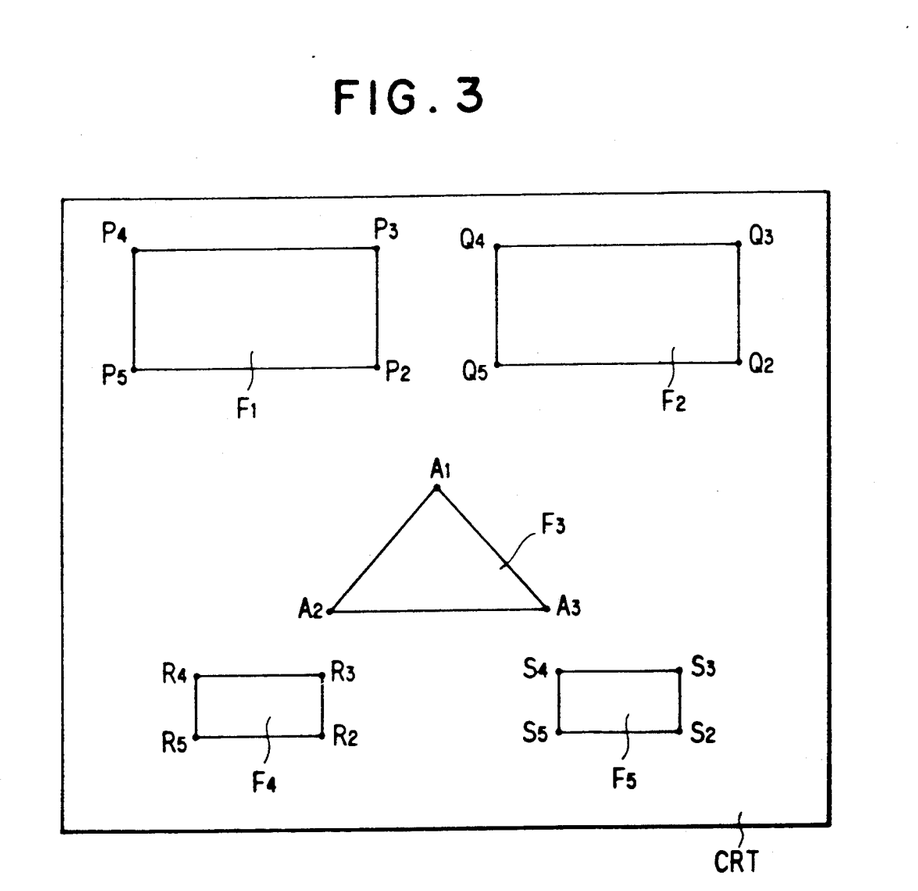
FIG. 3 is a view of a part profile which includes a plurality of similar shapes.

A method of creating a similar shape part program will now be described in accordance with a flowchart of processing for creating a part program shown in FIGS. 2(a) and 2(b) and dialog screens shown in FIGS. 3 through 9.

By way of a method similar to that of the prior art which uses dialog screens for figure definition and part profile definition, a profile F1 constructed by straight lines connecting points P2, P3, P4, P5 (FIG. 3), a profile F2 constructed by straight lines connecting points Q2, Q3, Q4, Q5, a profile F3 constructed by straight lines connecting points A1, A2, A3, a profile F4 constructed by straight lines connecting points R2, R3, R4, R5, and a profile F5 constructed by straight lines connecting points S2, S3, S4, S5 are defined and stored in the RAM 103 (step 201).

At the end of profile definition, the "PROFILE MOTION STATEMENT CREATION" item RMP is selected on the menu chart 108b (step 202). In response, the processor 102 paints the profiles F1 through F5 on the display screen in, say, the color yellow (indicated by the fine solid lines in FIG. 3), and displays a message on the display screen inquiring as to which profile is to serve as a reference profile (step 203). The operator then selects a reference profile (profile F1, by way of example), from the profiles F1 through F5 (step 204).

Figure 4:
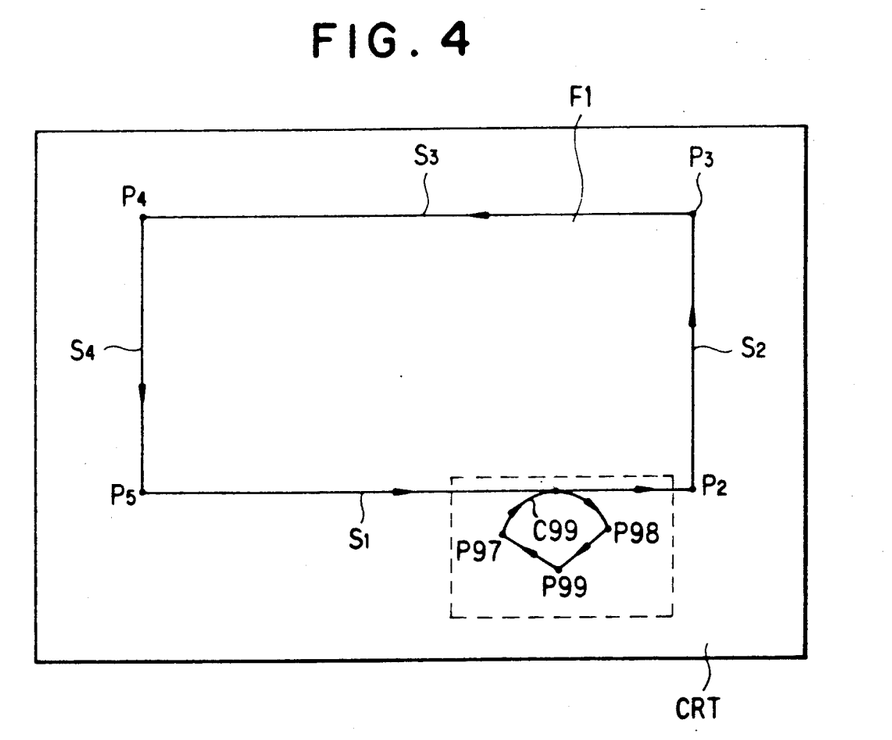
FIG. 4 is a view for describing a motion path of a reference profile.

When the reference profile is so designated, the processor 102 causes only the selected profile F1 to be display in enlarged form (step 205). FIG. 4 shows the profile F1 so displayed. The portion enclosed by the dashed lines is a portion which will be displayed based on motion statement definition as described later; it is not displayed at the present time.

Prompts for defining the motion definition statement of the profile F1 are subsequently displayed on the display screen in successive fashion, just as in the prior art. In response to these prompts, the operator enters (i) data specifying an approach path, (ii) a cutting starting point, (iii) a cutting direction, (iv) a cutting end point, and (v) data specifying a withdrawal path. On the basis of the entered data, the processor 2 creates the motion definition statement of the part program for machining the profile F1, (the reference profile) and displays the approach path, the machining path and the withdrawal path on the display screen (step 206).

By way of example, the part program shown below is created by such motion statement creation processing:

$$
\begin{aligned}
P97 &= \\
P98 &= \\
P99 &= \\
S1 &= P5, P2 \\
S2 &= P2, P3 \\
S3 &= P3, P4 \\
S4 &= P4, P5 \\
C99 &=
\end{aligned}
\quad (1)
$$

FROM. P99 (2)

TO. C99, P97 (3)

S1 (4)
S2
S3
S4
S1

C99, P98 CW (5)

P99 (6)

In the above part program for machining the profile F1, (1) is a figure definition statement, (2) through (6) are motion definition statements. P97 through P99 are points, C99 is a circular arc, and S1 through S4 are straight lines. Further, (2) is a coordinate system setting command which indicates that the machining starting point is point P99, (3) is an approach motion definition statement for passing through point P97 on circular arc C99 and then reaching the profile while travelling clockwise along the circular arc C99, (4) is a definition statement of a tool path for moving a tool along the straight lines in the order S1→S2→S3→S4→S1, (5) is a withdrawal motion definition statement for reaching the point P98 while travelling clockwise along the circular arc C99, and (6) is a withdrawal motion definition statement for arriving at the end point P99.

Figure 5:
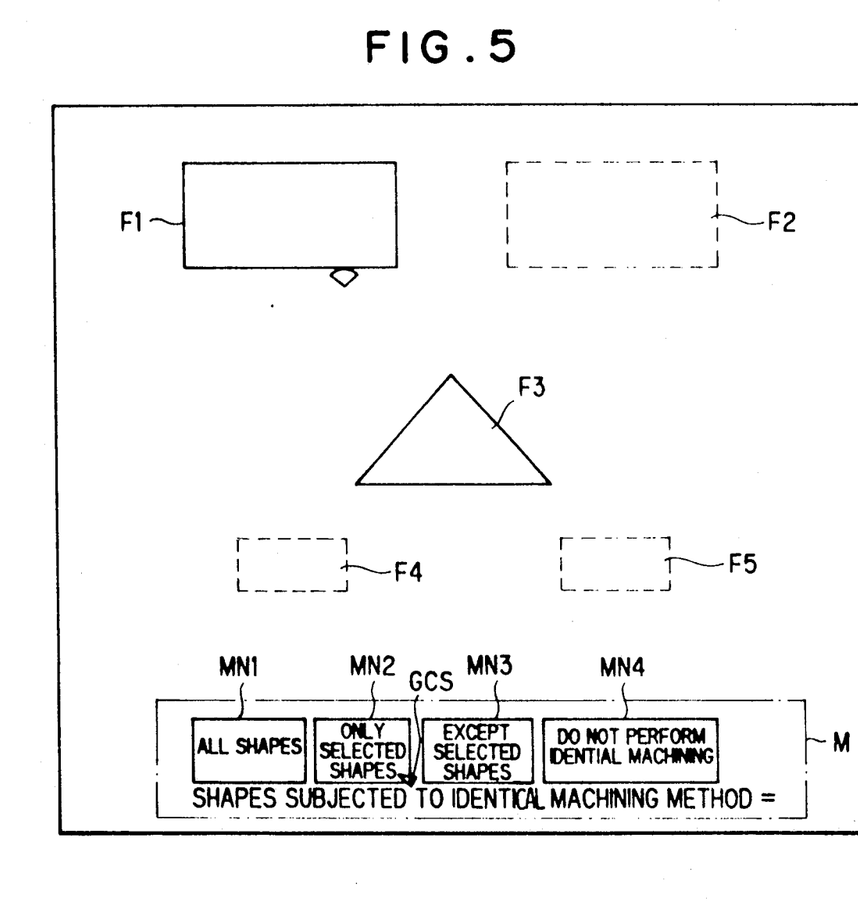
FIG. 5 is a view illustrating an example of a dialog screen showing prompts for selecting a similar shape.
Figure 6:
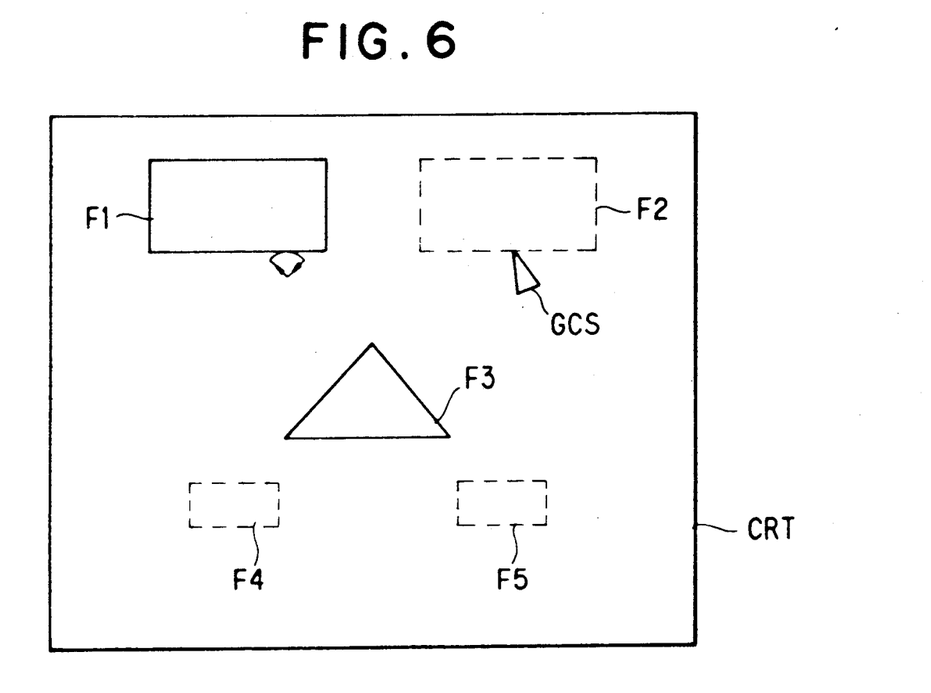
FIGS. 6 and 7 are views for describing a case in which a designated similar shape is machined under conditions the same as those of a reference profile.
Figure 7:
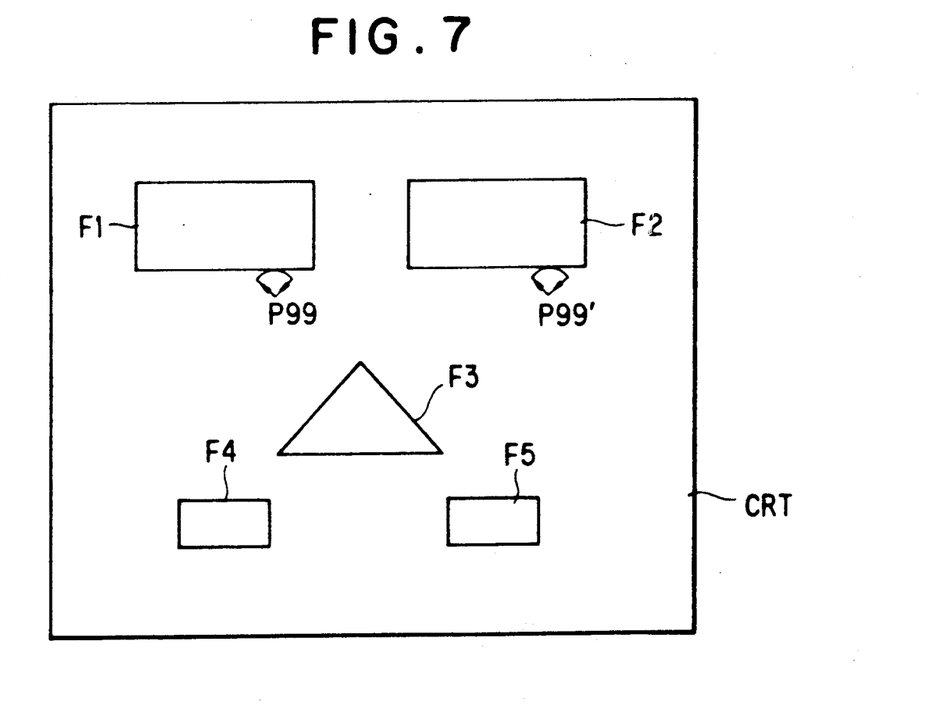
Figure 8:
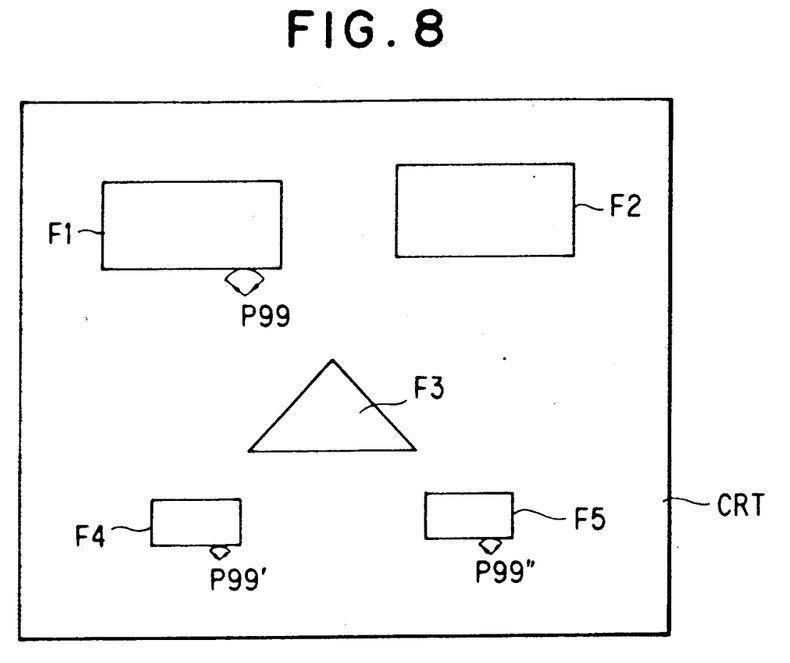
FIG. 8 is a view for describing a case in which an undesignated similar shape is machined under conditions the same as those of a reference profile.
Figure 9:
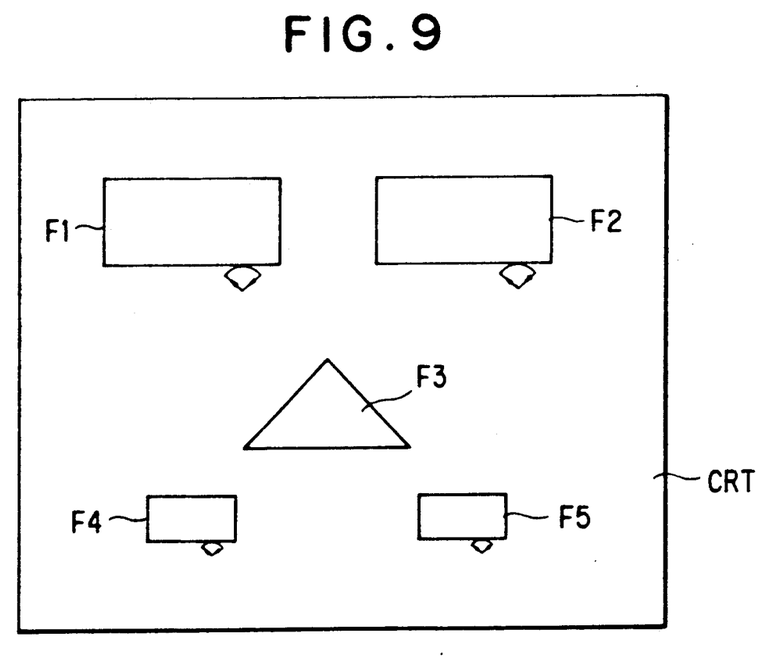
FIG. 9 is a view for describing a case in which all similar shapes are machined under conditions the same as those of a reference profile.

Upon finishing creation of the part program for the reference profile F1, the processor 102 changes the color in which the profile F1 is displayed (to the color blue, for example, as indicated by the bold solid line in FIG. 5), thereby indicating that creation of the part program for the profile F1 has been completed (step 207).

The processor 102 determines whether there are profiles present which are similar to the references profile F1. If such a profile is present, the profile is displayed so as to distinguish it from others (steps 208, 209). In this example, the profiles F2, F4, F5 are similar and the color in which these are painted is changed to, say, the color red (indicated by the dashed lines in FIG. 5). Thus, these profiles are readily distinguished from the profile F3 (indicated by the fine solid line in FIG. 5), which is not similar.

Thereafter, the processor 102 causes a message M, which makes inquiries regarding a method of selecting profiles to be machine by the same method, to be displayed on the display screen, as shown in FIG. 5 (step 210). In the message M illustrated in FIG. 5 item MN1 signifies selection of processing for creating a motion definition statement for machining all similar shapes under, the same conditions as the reference shape. Item MN2 signifies selection of processing for creating a motion definition statement for machining a designated profile under the same conditions. Item MN3 signifies selection of processing for creating a motion definition statement for machining similar profiles other than, a designated profile under the same conditions. Item MN4 means that processing for creating a motion definition statement for machining similar shapes under the same conditions is not to be carried out.

If, by way of example, item MN2 is selected by the graphic cursor GCS (FIG. 5) and then the similar profile F2 is designated (see FIG. 6), the processor 102 will execute processing to create a motion definition statement for machining the designated profile F2 under the same conditions as the profile F1 (steps 211, 212). It should be noted that the processor 102 creates the part program of the profile F2 using the part program of the profile F1. In this case, since the profiles F1 and F2 are exactly the same, a machining starting point P99 of the second profile F2 is decided automatically to be at the same position as the starting point P99 of the reference profile F1.

Upon finishing creation of the motion definition statement of profile F2, the processor 102 changes the color in which the profile F2 is painted from red to blue (indicated by the bold solid line in FIG. 7), thereby indicating that creation of the motion definition statement, namely the part program, of the profile F2 has been completed (step 213).

If, on the other hand, item MN3 is selected by the graphic cursor GCS and then the similar profile F2 is designated, the processor 102 will execute processing to create a motion definition statement for machining the undesignated profiles F4, F5 under the same conditions as the profile F1 (steps 214, 215). When creation of the motion definition statements for the profiles F4, F5 is completed, the processor 102 changes the color in which the profiles F4, F5 are painted from red to blue (indicated by the bold solid lines in FIG. 8), thereby indicating that creation of the motion definition statements of the profiles F4, F5 (part programs) has been completed (step 213). If profiles are similar and the size ratio of these profiles to the profile F1 is a prescribed ratio of m:1, as in the case of profiles F4 and F5, the processor 102 creates an approach motion definition statement and a withdrawal definition statement by reducing or enlarging the approach path and withdrawal path of the profile F1 at the prescribed ratio (m times).

When the item MN1 is selected by the graphic cursor GSC, the processor performs processing for creating a motion definition statement for machining all similar profiles F2, F4, F5 under the same machining conditions as the profile F1 (steps 216, 217). When creation of the motion definition statements for the profiles F2, F4, F5 is finished, the processor 102 changes the color in which the profiles F2, F4, F5 are painted from red to blue (indicated by the bold solid lines in FIG. 9), thereby indicating that creation of the motion definition statements of the profiles F2, F4, F5 has been completed (step 213).

When the item MN4 is selected by the graphic cursor GSC, processing for creating a motion definition statement for machining similar shapes under the same conditions is not carried out and processing is terminated.

In accordance with the invention, when a part program for machining a part having a plurality of similar shapes is created, a part program for machining one of the similar shapes is created beforehand. If this is done, then by merely designating another shape which is to be machined under the same machining conditions as the one of the similar shapes already processed enables creation of a part program for machining the designated similar shape under the same machining conditions. Further, in accordance with the invention, similar shapes to be machined are disposed on a screen and a part program for machining the plurality of similar shapes can be created quickly and easily while the state of arrangement among the shapes is verified and studied.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

We claim:

1. A similar shape part program creation method which creates a part program for machining a first shape and one or more shapes similar to the first shape, said method comprising the steps of:
   (a) defining a profile of a part having a plurality of similar shapes, the plurality of similar shapes includes the first shape and the one or more shapes similar to the first shape;
   (b) displaying the profile of the part on a display screen;
   (c) creating a part program for machining the first shape of the plurality of similar shapes to serve as a reference;
   (d) finding automatically the one or more shapes similar to the first shape and displaying the one or more shapes on the display screen;
   (e) specifying on the display screen a similar shape, from the one or more shapes similar to the first shape, to be machined under machining conditions identical to those of the first shape; and
   (f) creating automatically a part program of the similar shape specified in step (e) using the part program of the first shape.

2. A similar shape part program creation method according to claim 1,
   wherein the first shape and the similar shape each have a size,
   wherein the part program of the first shape includes at least an approach path and a withdrawal path, each having a size, and
   wherein when a ratio of the size of the first shape to the size of the similar shape is 1:m, said method further comprises the step of (g) scaling the part program of the similar shape created in step (f) by multiplying the sizes of the approach path and the withdrawal path specified by the part program of the first shape by m.

3. A similar shape part program creation method according to claim 2,
   wherein said specifying in step (e) comprises the steps of:
   (i) displaying, on the display screen, messages reading "MACHINE ALL" and "MACHINE ONLY DESIGNATED SHAPES" for the one or more shapes similar to the first shape; and
   (ii) selecting one of the messages, and
   wherein when "MACHINE ALL" is selected, step (f) creates the part program for each of the shapes similar to the first shape under machining conditions identical with those of the first shape.

4. A similar shape part program creation method according to claim 3, wherein when "MACHINE ONLY DESIGNATED SHAPES" is selected, the part program subsequently created in step (f) for machining the similar shape specified in step (e) under machining conditions identical with those of the first shape.

5. A method for creating a part program for machining a part having a plurality of shapes, the plurality of shapes including a reference shape and at least one similar shape, said method comprising the steps of:
   (a) defining a profile of the part;
   (b) identifying the reference shape from the plurality of shapes;
   (c) producing a reference part program for machining the reference shape;
   (d) automatically identifying at least one similar shape to be machined under machining conditions substantially identical to machining conditions of the reference part program for the reference shape; and
   (e) producing a similar part program for machining the at least one similar shape identified in step (d) based on the reference part program.

6. A method according to claim 5, wherein said identifying in step (b) comprises the steps of:
   (i) selecting the reference shape from the plurality of shapes; and
   (ii) distinguishably displaying the reference shape.

7. A method according to claim 6,
   wherein the plurality of shapes includes a plurality of similar shapes, and
   wherein said identifying in step (d) comprises the steps of:
   (i) distinguishably displaying the plurality of similar shapes; and
   (ii) selecting the at least one similar shape from the plurality of similar shapes.

8. A method according to claim 7, wherein said producing in step (e) comprises the steps of:
   (i) obtaining a size ratio of the reference shape to the at least one similar shape;
   (ii) scaling the reference part program in accordance with the size ratio to produce a scaled reference part program; and (iii) producing the similar part program for the at least one similar shape using the scaled reference part program.

9. A method according to claim 5, wherein said producing in step (e) comprises the steps of:
(i) obtaining a size ratio of the reference shape to the at least one similar shape;
(ii) scaling the reference part program in accordance with the size ratio to produce a scaled reference part program; and
(iii) producing the similar part program for the at least one similar shape using the scaled reference part program.

10. A method according to claim 5, wherein the plurality of shapes includes a plurality of similar shapes,
wherein the part program includes at least the reference part program and the similar part program, and the reference part program and the similar part program include at least motion definition statement, and
wherein the similar part program is produced in step (e) for each of the similar shapes identified in step (d).

11. A system for creating a part program for machining a part having a plurality of shapes, the plurality of shapes including a reference shape and at least one similar shape, said system comprising:
selection means for defining a profile of the part, for identifying the reference shape from the plurality of shapes, and for identifying at least one similar shape from the plurality of shapes; and
processor means, operatively connected to said selection means, for controlling the creating of the part program, said processor including at least
definition means for defining the profile of the part in conjunction with said selection means;
reference part program creation means for producing a reference part program for machining the reference shape; and
similar part program creation means for producing a similar part program for machining the at least one similar shape under machining conditions substantially identical to machining conditions of the reference part program based on the reference part program.

12. A system according to claim 11, wherein said system further comprises:
means for obtaining a size ratio of the reference shape to the at least one similar shape;
means for scaling the reference part program in accordance with the size ratio to produce a scaled reference part program; and
means for producing the similar part program for the at least one similar shape using the scaled reference part program.

* * * * *

UNITED STATES PATENT AND TRADEMARK OFFICE
CERTIFICATE OF CORRECTION

PATENT NO. : 5,113,338

DATED : May 12, 1992 PAGE 1 of 2

INVENTOR(S) : Seki et al.

It is certified that error appears in the above-identified patent and that said Letters Patent is hereby corrected as shown below:

In the Drawings:

FIG. 5 (Sheet 6 of 8, in "MN4" Box), "IDENTIAL" should be --IDENTICAL---.

Col. 1, line 43, "Accordingly, an" should be --An--;

line 46, "easily:" should be --easily.--;

line 60, "shaped" should be --shape--;

line 62, "program," should be --program--.

Col. 2, line 1, "FIG." should be --FIGS.--.

Col. 3, line 3, "display" should be --displayed--;

line 17, "F1." should be --F1--; "profile)" should be --profile),--;

line 68, "references" should be --reference--.

UNITED STATES PATENT AND TRADEMARK OFFICE
CERTIFICATE OF CORRECTION

PATENT NO. : 5,113,338

DATED : May 12, 1992

INVENTOR(S) : Seki et al.

It is certified that error appears in the above-identified patent and that said Letters Patent is hereby corrected as shown below:

Col. 4, line 11, "machine" should be --machined--;

line 13, "5" should be --5,--;

line 16, "under," should be --under--;

line 21, "than," should be --than--;

line 35, "P99" should be --P99'--.

Col. 8, line 3, after "identifying" insert --the--.

Signed and Sealed this

Second Day of November, 1993

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,113,338
DATED : May 12, 1992
INVENTOR(S) : Seki et al

It is certified that error appears in the above-indentified patent and that said Letters Patent is hereby corrected as shown below:

On title page, item [73] "Yamanachi" should read --Yamanashi--

Signed and Sealed this

Third Day of May, 1994

Attest:

BRUCE LEHMAN

Attesting Officer

Commissioner of Patents and Trademarks